(12) United States Patent
Jackson et al.

(10) Patent No.: US 11,787,585 B2
(45) Date of Patent: Oct. 17, 2023

(54) PALLET WRAPPER AND IMAGING SYSTEM

(71) Applicant: Rehrig Pacific Company, Los Angeles, CA (US)

(72) Inventors: Peter Douglas Jackson, Alpharetta, GA (US); Robert Lee Martin, Jr., Lucas, TX (US); Daniel James Thyer, Charlotte, NC (US); Vance Asher Weintraub, Denton, TX (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 17/891,980

(22) Filed: Aug. 19, 2022

(65) Prior Publication Data

US 2023/0059103 A1    Feb. 23, 2023

Related U.S. Application Data

(60) Provisional application No. 63/284,707, filed on Dec. 1, 2021, provisional application No. 63/277,532, filed on Nov. 9, 2021, provisional application No. 63/234,877, filed on Aug. 19, 2021.

(51) Int. Cl.
  *B65B 11/04*  (2006.01)
  *B65B 57/12*  (2006.01)
  *G06T 7/00*   (2017.01)

(52) U.S. Cl.
  CPC ............ *B65B 57/12* (2013.01); *B65B 11/045* (2013.01); *G06T 7/0004* (2013.01); *G06T 2207/20081* (2013.01)

(58) Field of Classification Search
  USPC .............................................. 53/55
  See application file for complete search history.

(56) References Cited

U.S. PATENT DOCUMENTS

| | | | |
|---|---|---|---|
| 6,918,229 B2 | 7/2005 | Lancaster, III et al. |
| 8,739,502 B2 | 6/2014 | Lancaster, III |
| 9,171,278 B1 | 10/2015 | Kong et al. |
| 9,725,195 B2 | 8/2017 | Lancaster, III et al. |
| 9,821,344 B2 | 11/2017 | Zsigmond et al. |
| 9,944,417 B2 | 4/2018 | Lemieux et al. |
| 10,220,970 B2 | 3/2019 | Lemieux et al. |
| 10,229,487 B2 | 3/2019 | Goyal et al. |

(Continued)

FOREIGN PATENT DOCUMENTS

WO    2020142385 A1    7/2020

OTHER PUBLICATIONS

International Search Report for International Application No. PCT/US22/40954 dated Mar. 31, 2023.

*Primary Examiner* — Chinyere J Rushing-Tucker
(74) *Attorney, Agent, or Firm* — Carlson, Gaskey & Olds, P.C.

(57) ABSTRACT

A pallet wrapper and imaging system a pallet loaded with containers to calculate a sustainability based upon a type of the pallet and the containers on the pallet. The system also determines the stability of the pallet and containers, a speed at which the pallet and containers can be wrapped, and an amount of stretch film needed to secure the load for transport. After validation by the imaging system (with or without a wrapper), a QC bot assists a QC worker in remedying or checking any detected errors or potential errors.

20 Claims, 16 Drawing Sheets

(56) References Cited

U.S. PATENT DOCUMENTS

| | | |
|---|---|---|
| 10,491,881 B1 | 11/2019 | Russell et al. |
| 10,616,553 B1 | 4/2020 | Russell et al. |
| 10,643,038 B1 | 5/2020 | McCalib, Jr. et al. |
| 10,724,973 B2 | 7/2020 | Paresi |
| 10,796,423 B2 | 10/2020 | Goja |
| 10,845,499 B2 | 11/2020 | Paresi |
| 11,046,519 B2 | 6/2021 | Martin, Jr. et al. |
| 11,087,160 B2 | 8/2021 | Martin, Jr. et al. |
| 2006/0187041 A1 | 8/2006 | Olsen, III et al. |
| 2010/0030601 A1 | 2/2010 | Warther et al. |
| 2012/0057022 A1 | 3/2012 | Nechiporenko et al. |
| 2015/0101281 A1 | 4/2015 | Kudia |
| 2016/0110630 A1 | 4/2016 | Heusch et al. |
| 2018/0273226 A1 | 9/2018 | Lancaster, III et al. |
| 2019/0212760 A1* | 7/2019 | Tiwari ............. G05D 23/27543 |
| 2020/0134830 A1* | 4/2020 | Yu ........................... G06T 7/174 |
| 2020/0283176 A1* | 9/2020 | Lancaster, III ....... B65B 11/045 |
| 2021/0198042 A1 | 7/2021 | Martin, Jr. et al. |
| 2021/0331869 A1 | 10/2021 | Martin, Jr. et al. |
| 2022/0355962 A1* | 11/2022 | Nekkanti .............. B65B 11/045 |

* cited by examiner

PALLET WRAPPER AND IMAGING SYSTEM

BACKGROUND

Various types of pallet wrappers are known to wrap stretch film or stretch wrap around stacked items on a pallet. In one type of pallet wrapper, the loaded pallet is placed on a turntable that rotates relative to a roll of stretch film. As the turntable is rotated, the stretch film is dispensed about the loaded pallet. The pallet wrapper changes the height of the roll as the turntable rotates, so that the stretch film is wrapped about the entire or substantially the entire height of the loaded pallet.

In another type of pallet wrapper, the loaded pallet is stationary and the pallet wrapper moves about the loaded pallet, unrolling the stretch film about the items on the pallet. Again, the height of the roll is changed as the pallet wrapper travels around the pallet so that all or substantially all the height of the pallet and items is wrapped. Other variations are also known.

SUMMARY

The present disclosure provides a pallet wrapper and imaging system with several improvements that can be practiced independently of one another, and some of which could be performed with or without the wrapper.

First, the system images a pallet loaded with items to calculate a sustainability based upon a type of the pallet and the items on the pallet. This could be done as part of or independently of the wrapper. This could be done as part of or independently of the validation.

Second, the system images the pallet loaded with items to determine the pallet stability and the minimum amount (or appropriate amount) of stretch film needed to secure the load for transport.

Third, after validation by the imaging system (with or without a wrapper), a QC bot assists a QC worker in remedying or checking any detected errors or potential errors.

DETAILED DESCRIPTION

Figure 1:
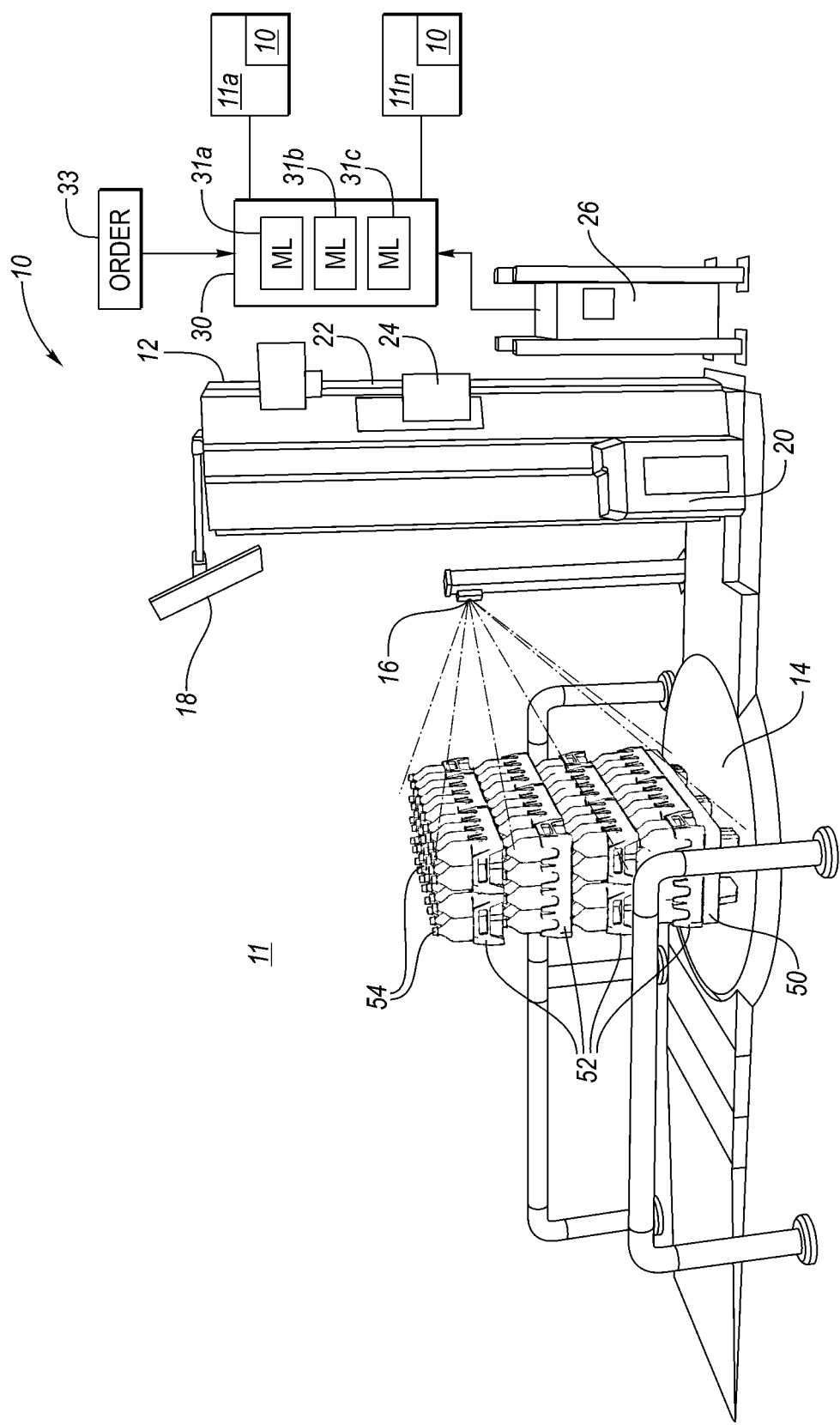
FIG. 1 is a perspective view of one possible implementation of a pallet wrapper and imaging system.

FIG. 1 shows an example pallet wrapper and imaging system 10 according to one possible embodiment in a warehouse 11. The system 10 includes a pallet wrapper 12 having a turntable 14 and at least one camera 16 directed toward the area above the turntable 14. A weight sensor (not visible) may be in or under the turntable 14 for measuring weight on the turntable 14.

Lights 18 direct illumination toward the area above the turntable 14 to assist the camera 16. A roll of stretch film 20 is mounted to a tower 22 adjacent the turntable 14. As is known, the roll of stretch film 20 is mounted to be moved vertically on the tower 22, such as by a motor (not shown), while the turntable 14 rotates.

A user interface 24, such as a touchscreen, is mounted on or near the tower 22. A computer 26 includes at least one processor and storage which stores instructions that when executed by the processor perform the functions described herein. The computer 26 receives images from the camera 16, weight data from the weight sensor, communicates with the user interface 24, and controls the turntable 14 and lights 18.

The computer 26 sends all collected data to a server 30, which could be a cloud computer that also receives the same data from other such systems 10 in the same warehouse 11 and such systems 10 in other warehouses 11*a*-11*n* in other geographic locations around the world. The server 30 also includes at least one processor and storage which stores instructions which when executed by the processor perform the functions described herein. The server 30 also stores at least one machine learning model, and preferably a plurality of machine learning models 31*a*-*c* trained on images of the items, i.e. the packages of beverage containers described below. For example, the machine learning models 31*a*-*c* can be trained by manually labeling images of the available packages of beverage containers.

Alternatively, there could be a DC computer at each warehouse that periodically receives a copy of all the machine learning models 31*a*-*c* from the server 30. The computer 26 could send all the collected data to the DC computer, which would analyze the data based upon the machine learning models as described herein. The data may also be synced to the server 30 for the comparisons between warehouses 11, 11*a*-*n* as described below. The tasks described herein, or portions thereof, could be performed by any of the different computers described herein.

In use, a pallet 50, which could be a half-pallet or a full-size pallet, is loaded with items such as packages of beverage containers. For example, an item may be a plastic bottle crate 52 (secondary packaging), each containing primary packaging, such as a plurality of bottles 54. In FIG. 1, a plurality of plastic bottle crates 52 are each loaded with plastic bottles 54. The loaded bottle crates 52 are stacked on one another and on a plastic half-pallet 50. The loaded pallet 50 is placed on the turntable 14 (or otherwise in the field of view of the at least one camera 16).

The computer 26 controls the turntable 14 and the camera 16 so that the turntable 14 rotates and the camera 16 takes one or more images of the loaded pallet 50. Preferably, the camera 16 takes an image of each of the four sides of the loaded pallet 50. The computer 26 receives the images of the loaded pallet 50.

The assignee of the present application has developed a validation system that uses machine learning to identify skus of the items on the pallet 50. This is disclosed more fully in US20220129836, filed Oct. 22, 2021, assigned to the assignee of the present application and which is hereby incorporated by reference in its entirety. Briefly, as described in previous patents, the server 30 receives a plurality of orders 33 and presents a pick list of skus to the user, indicating which items to place on each pallet 50. A worker places the items (e.g. the plastic bottle crates 52 with the plastic bottles 54) on the pallet 50 according to the pick list and places the loaded pallet 50 on the turntable 14 for validation and wrapping.

The computer 26 identifies the skus of the items on the pallet 50. In one implementation, the packaging type of each item on the pallet 50 (which in this example is a known/expected combination of both the secondary packaging and the primary packaging) is first identified using one machine learning model 31a to analyze the images of the loaded pallet 50. The package types may include, just as illustrative examples, plastic beverage crate with 24 20 oz plastic bottles, corrugated cardboard box, cardboard tray with 24 20 oz plastic bottles and plastic overwrap, cardboard box holding 36 12 oz aluminum cans, and others. The "brand" (i.e. the specific content, such as the flavor and type of the beverage) is then identified using another machine learning model 31b (which has been selected from among a plurality of brand machine learning models based upon the identified package type) to analyze the images of the loaded pallet 50. The computer 26 then compares the identified skus to the skus on the order/pick list and generates alerts for any mismatches.

Sustainability

In one example implementation, the images are also sent to another machine learning model 31c where the package type of every item is identified, such as plastic beverage crate with plastic bottles or aluminum cans, corrugated cardboard box, cardboard tray with plastic overwrap, cardboard box holding aluminum cans, and others. In this example application, since it is expected that the primary container will always be aluminum cans or plastic bottles, the focus here is on the secondary packaging, i.e. reusable crate versus one-way cardboard tray or one-way cardboard box. Additionally, information regarding the pallet 50 itself is also determined by the machine learning model 31c, for example, whether the pallet a reusable plastic pallet or is a one-way pallet (e.g. wood pallet). Alternatively, the package type determinations made by the machine learning models 31a that were used to identify the skus of the items on the pallet 50 could be used.

In this implementation, the system 10 also generates information regarding sustainability based upon the identified package types and pallet types. This information may be displayed to the user immediately and/or may be accumulated by the computer 26 and provided in summary form. For example, the pallet 50 and secondary packaging 52 (and optionally the primary packaging, such as the bottles 54) are assessed for sustainability based upon specific criteria, such as whether they are one-way or reusable and/or recyclable, or how much of each package is one-way versus reusable/recyclable. For example, a beverage containers may be packaged in a cardboard (one-way) 'tray' or 'box' with plastic 'overwrap' (one-way), or the beverage containers may be packaged in plastic beverage crates (reusable and eventually recyclable). The pallet 50 may be plastic (reusable and eventually recyclable) or wood (one-way).

The server 30 accumulates the information regarding sustainability for all items on all pallets 50 in that warehouse and in other warehouses.

The system 10 may perform a life cycle analysis of the pallet and packaging, generally containing the following information:

1. Cradle to Gate—As it drops out of injection molding machine how many CO2 kg are emitted from the manufacture of that product 2. For the manufacturer—How many times is it used, what distances, servicing needs, etc.

3. Incremental benefits of using the reusable packaging

Category 1—"CO2 avoidance" or Category 2—"waste elimination"

Figure 2:
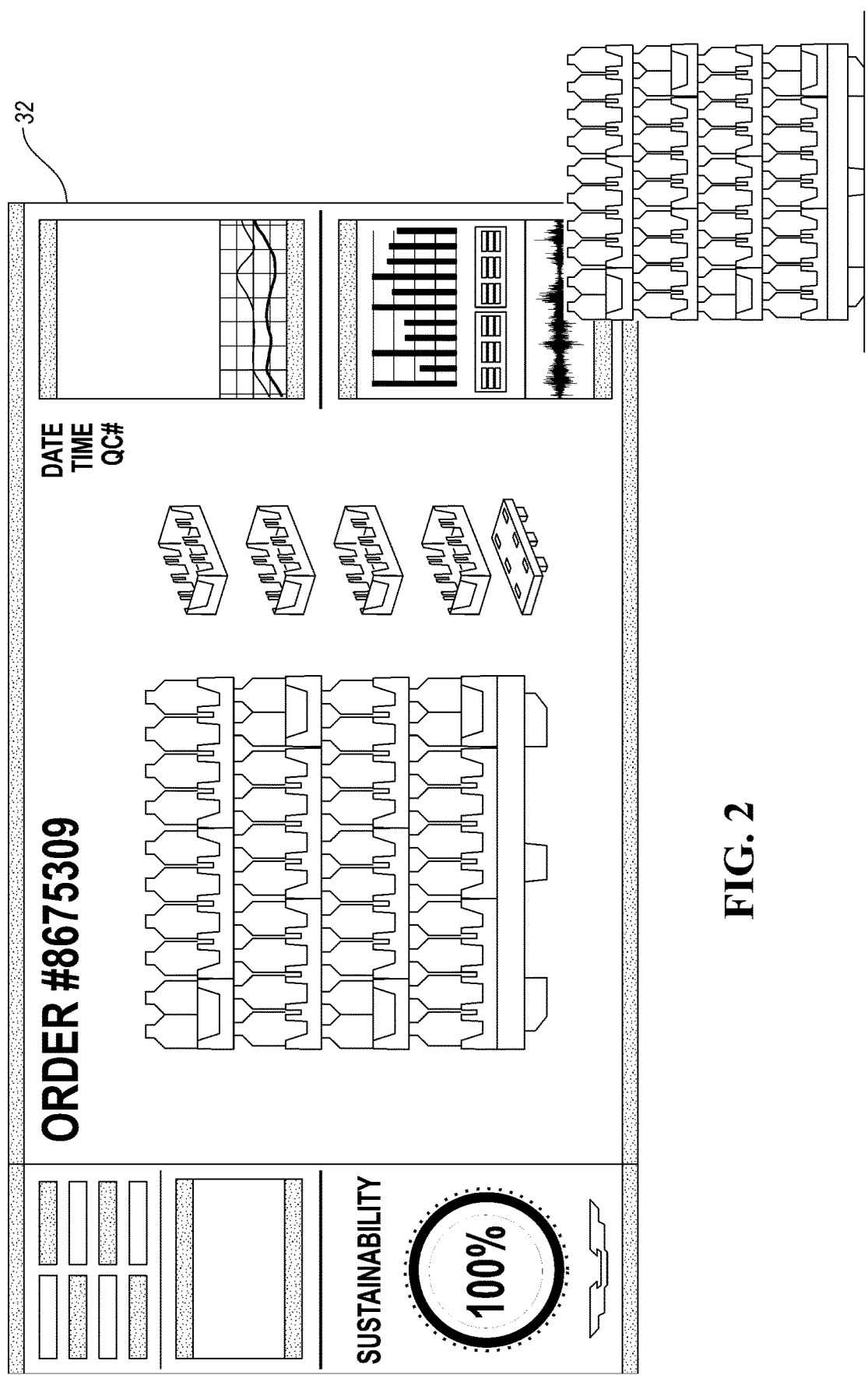
FIG. 2 shows an example user interface screen indicating a high sustainability score of the loaded pallet.

FIG. 2 shows a screen 32 that the system 10 may be presented to the user by the server 30, either on the user interface 24, or on another user interface, indicating a loaded pallet 50 with a high sustainability score (in this example, 100%). The loaded pallet 50 in FIG. 2 is the same as the loaded pallet 50 of FIG. 1. The sustainability score is high because the pallet 50 is plastic which is reusable many times and eventually recyclable and because all the secondary packaging is plastic beverage crates 52, which can also be reused many times and then eventually recycled. Again, the beverage bottles 54 inside the crates 52 are always recyclable.

Figure 3:
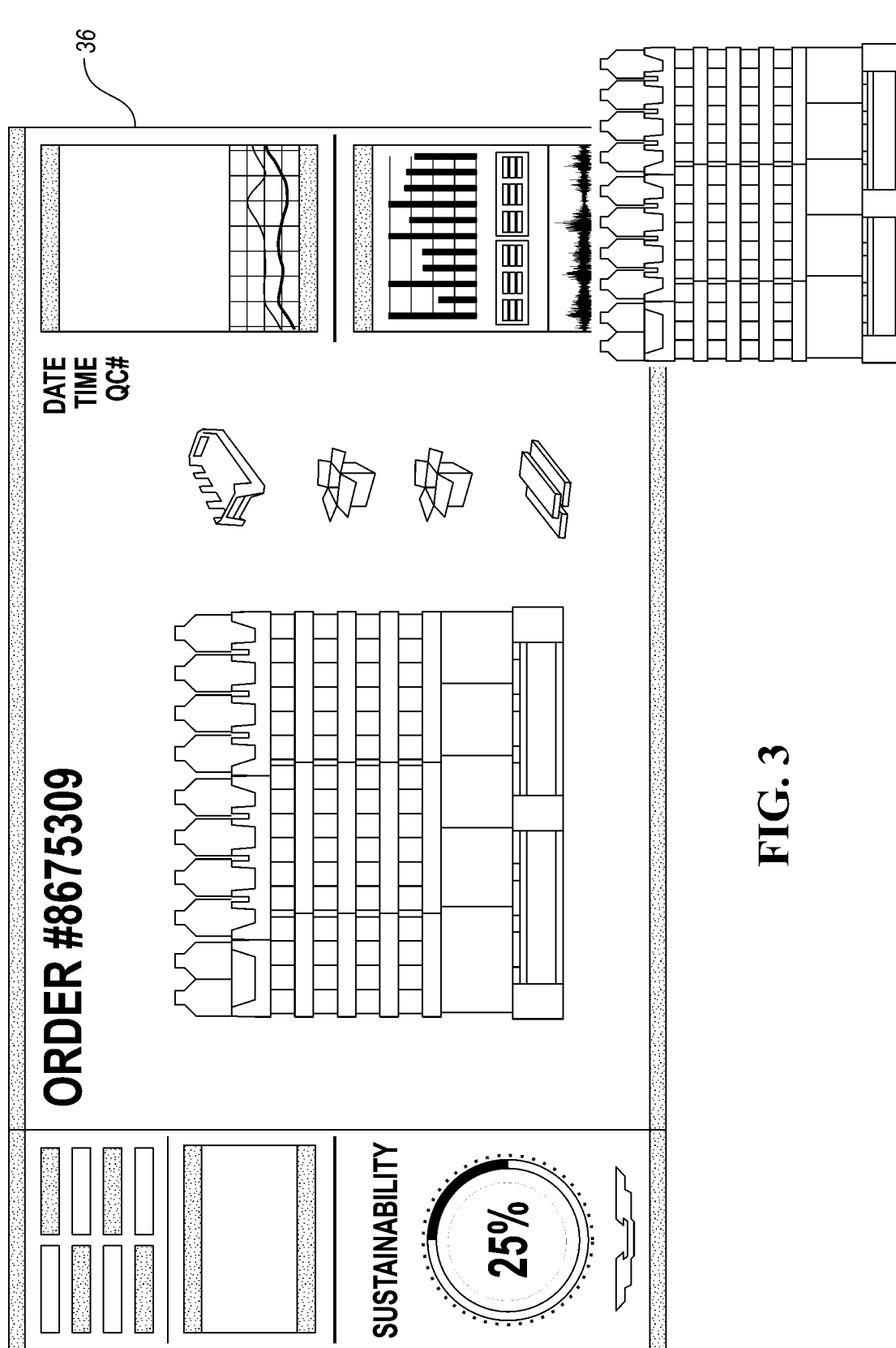
FIG. 3 shows an example user interface screen indicating a low sustainability score of the loaded pallet.

FIG. 3 shows a similar screen 34 that the server 30 may present to a user but indicating a loaded pallet 50 with a low sustainability score (in this example, 25%). In this example, the pallet 50 is wood, which is not recyclable and is eventually discarded. Most of the secondary packaging 52 on this pallet 50 is cardboard, which is not reusable. In this example the upper layer of items on the pallet 50 comprises plastic reusable beverage crates, which is the portion of this loaded pallet 50 that is sustainable.

Figure 4:
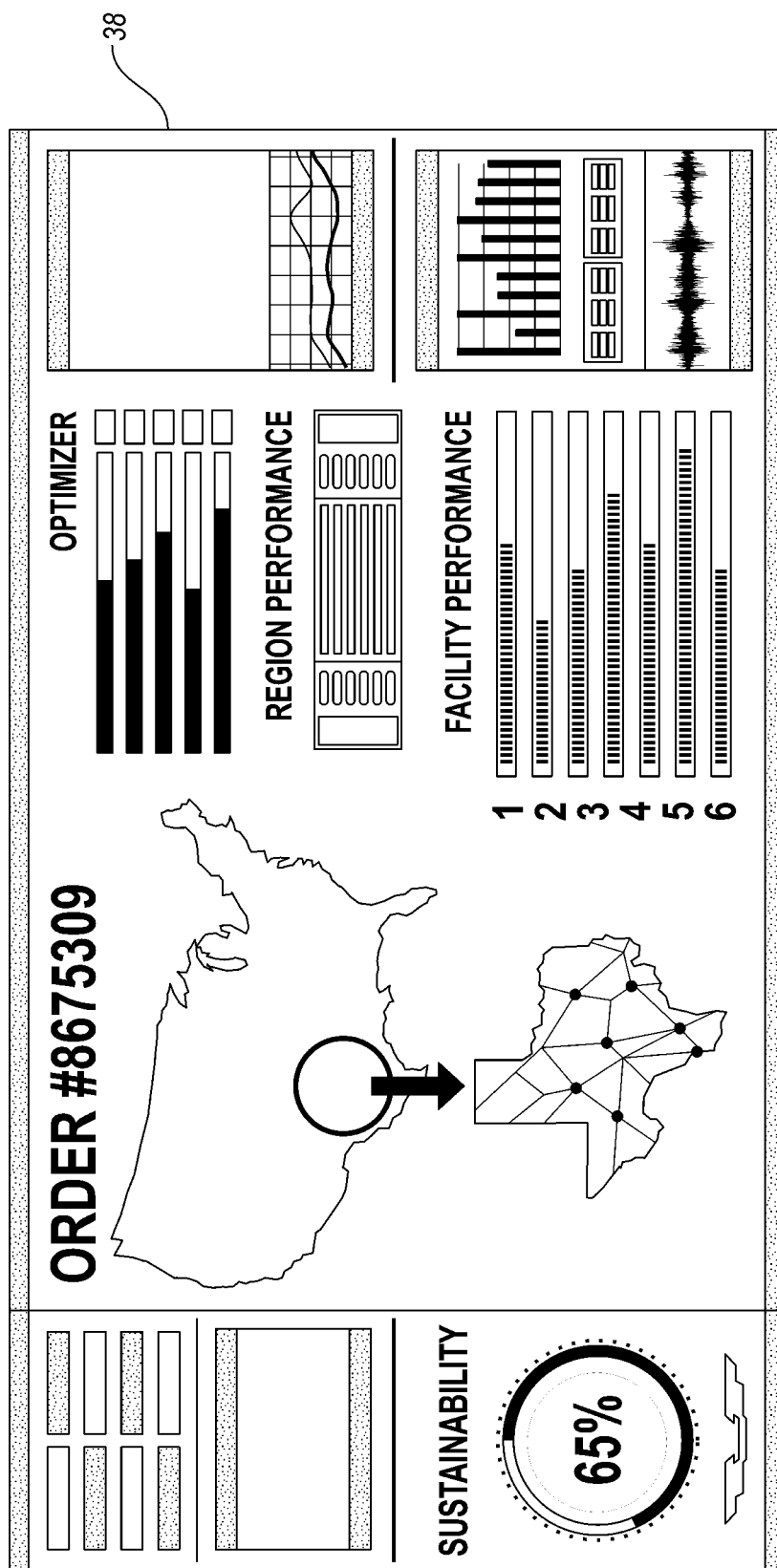
FIG. 4 shows an example user interface screen indicating current and past sustainability scores or percentages from an overall, regional or local level.

FIG. 4 shows a screen 38 that may be presented by the server 30 to a user to present current and past sustainability scores or percentages from an overall, regional or local level. The user can use this data to determine which regions and which facilities are doing well with sustainability and which regions and facilities need to improve the sustainability of their operations. The system 10 can also show changes over time overall, regionally, and locally, so the user can track improvement in sustainability. For example, FIG. 4 shows a graph comparing the sustainability of six different warehouses in a geographic region. FIG. 4 also shows an overall sustainability rating (65%) for that geographic region.

Figure 5:
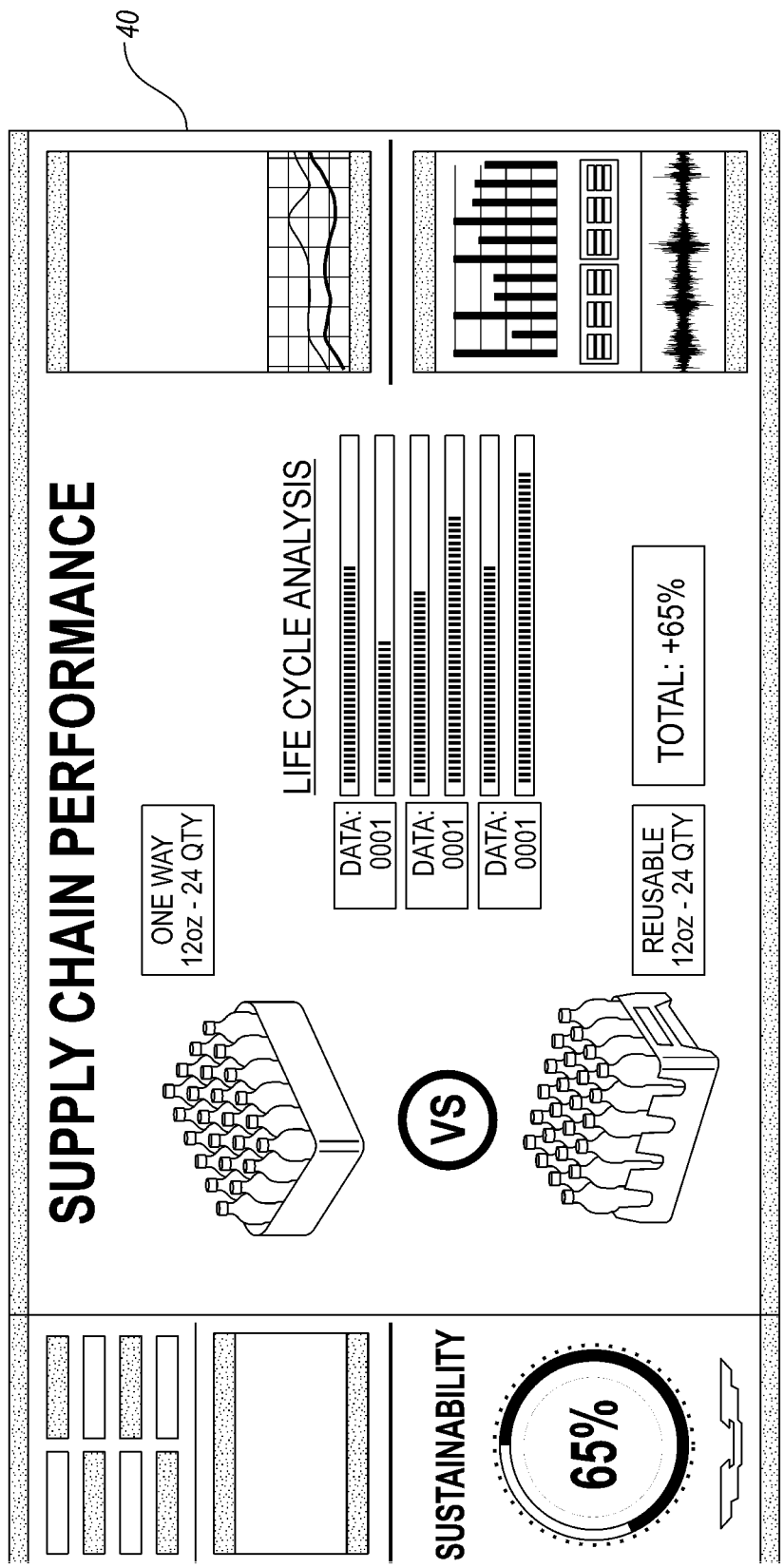
FIG. 5 shows an example user interface screen that assists the user in improving the sustainability of the company's operations locally, regionally or overall.

Referring to FIG. 5, the server 30 may also present a screen 40 that can assist the user in improving the sustainability of the company's operations locally, regionally or overall. For example, the user can send a request to the server 30 asking how one or more changes would affect the sustainability score. Upon request the by the user, the system 10 can show the user on the screen 40 how switching from one package to another will improve sustainability. In the example shown, the system 10 indicates that sustainability would improve 65% by switching from one-way cardboard trays to reusable beverage trays for 24 12 oz bottles.

Wrapper Optimization

Figure 6A:
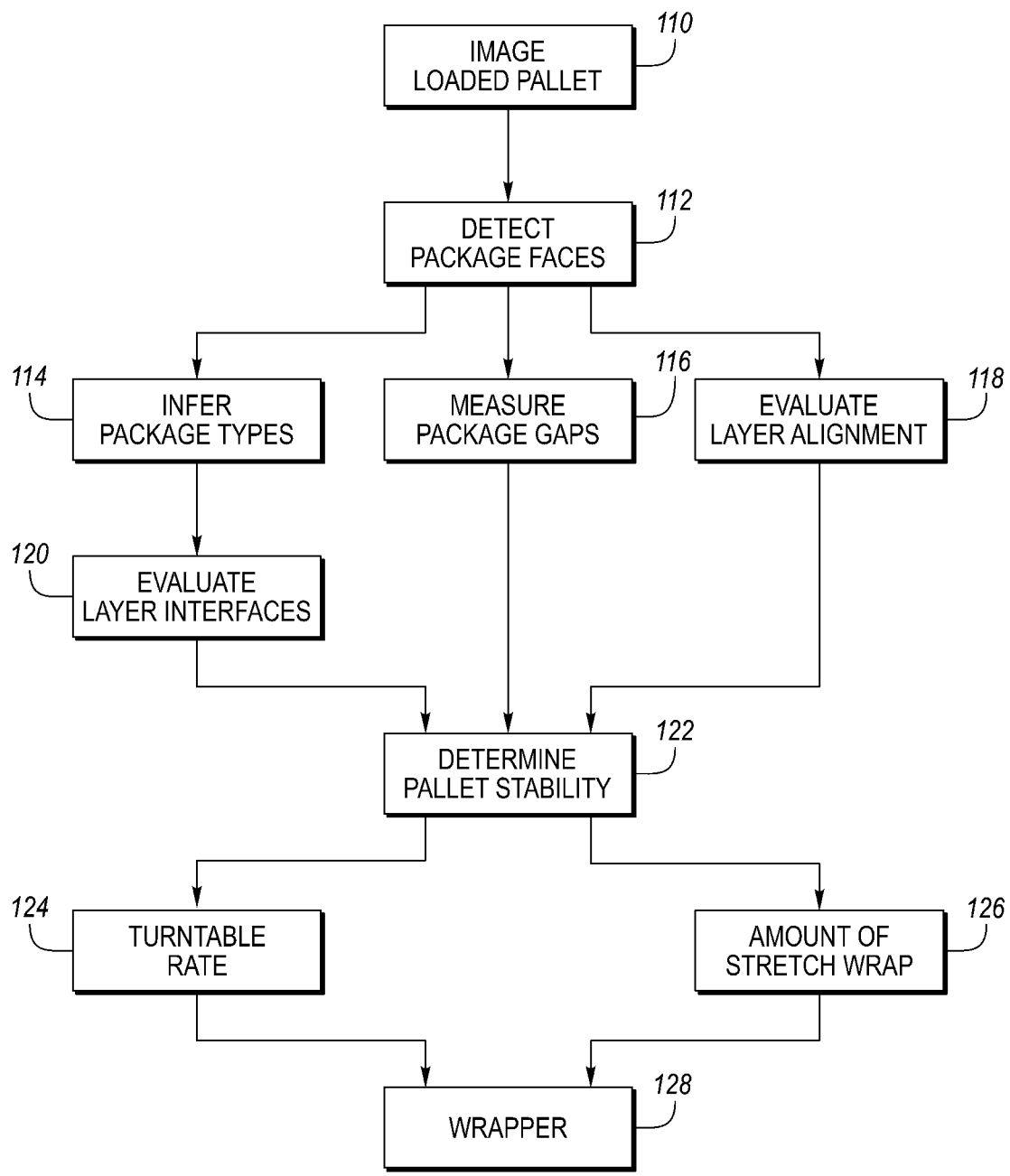
FIG. 6A is a flow chart showing one possible method for determining stability of a loaded pallet.

Using the images from the camera 16, the computer 26 may also optimize the wrapping process. Referring to FIG. 1 and the flow chart of FIG. 6A, in step 110 the camera 16 takes one or more images of the loaded pallet 50 prior to initiating wrapping of the loaded pallet 50. As an example, the turntable 14 may rotate such that the camera 16 can image each of the four sides of the loaded pallet 50. The computer 26 analyzes the images prior to wrapping the loaded pallet 50, optionally including validating the skus of the items on the pallet 50 against the associated order and rating the sustainability, as above.

The server 30 also analyzes the images of the loaded pallet 50 to determine the stability of the loaded pallet 50. In step 112, the server 30 detects the package faces (such as by edge detection), including bounding boxes for each package, including the pixel coordinates of each of the bounding boxes. In step 114, the server 30 determines what package types are in each location on the pallet 50. Steps 112 and 114 may already be performed for validation and/or sustainability. The server 30 has identified the package type and location of every item on the pallet 50.

Based upon the coordinates of the bounding boxes of the package faces, the server 30 can determine gaps between adjacent packages in step 116. The server 30 may also analyze the coordinates of the bounding boxes to detect height discrepancies between items in a layer on the pallet 50, which would decrease stability. Additionally, the server 30 may analyze the overall height of the loaded pallet 50 in terms of absolute height and/or number of layers or some combination of both, because a taller stack of items on a pallet 50 is less stable than a short stack of items on a pallet 50, and more layers of items is less stable than fewer layers.

In step 118, the server 30 evaluates layer alignment. For example, column stacked items (i.e., each item in one layer is stacked on one item in the layer below) is less stable than cross-stacked layers or "brick-stacked" layers in which each item in a layer is stacked on more than one item in the layer below (e.g. half on one item and half on another item).

In step 120, the server 30 evaluates the interfaces between adjacent layers. The server 30 analyzes the stability of each interface between the layers in the stack, i.e. between each layer of items and between the bottom layer of items and the pallet 50. Some package types are very stable if on the top layer, but less stable if other items are stacked on top of them. The package type and the locations of the package types are factors in the stability of the loaded pallet 50 prior to wrapping. For example, the tops of bottles in plastic crates may be received in recesses in the bases of similar crate stacked thereon, created a very stable interface between those layers. Cardboard boxes on the other hand have smooth upper surfaces and smooth lower surfaces and therefore provide a less stable interface between layers.

In step 122, the server 30 determines the stability of the loaded pallet 50 based upon the evaluation of the layer interfaces 120, the measurements of the package gaps 116, and the evaluation of the layer alignment 118.

Based upon the determined level of stability, in step 126, the server 30 may send information to the computer 26 indicating how much stretch film 20 to use to wrap the loaded pallet 50. The loaded pallet 50 must be stable, but unnecessary wrapping will waste stretch film 20 and take more time on the wrapper (more turns of the turntable 14), which reduces efficiency. Therefore, determining the proper amount of stretch film 20 is beneficial. The computer 26 may also determine how/where to place the stretch film 20 (e.g. more at the top of the stack and less at the bottom of the stack, or vice versa).

Additionally, in step 124, based upon the level of stability of the loaded pallet 50, the computer 26 also determines how fast the turntable 14 can be rotated safely. Rotating the turntable 14 faster reduces the time necessary to wrap the loaded pallet 50, which increases efficiency in the warehouse; however, if the loaded, unwrapped pallet 50 is not yet stable, the turntable 14 cannot be rotated too fast or the items may fall off the pallet 50 or shift.

The server 30 sends the turntable rate 124 and the amount and/or pattern of stretch film placement to the wrapper 12.

Again, functions described as being performed on the server 30 could alternatively be performed in whole or in part on the computer 26 (or a DC computer at each warehouse 11) and vice versa.

Figure 6B:
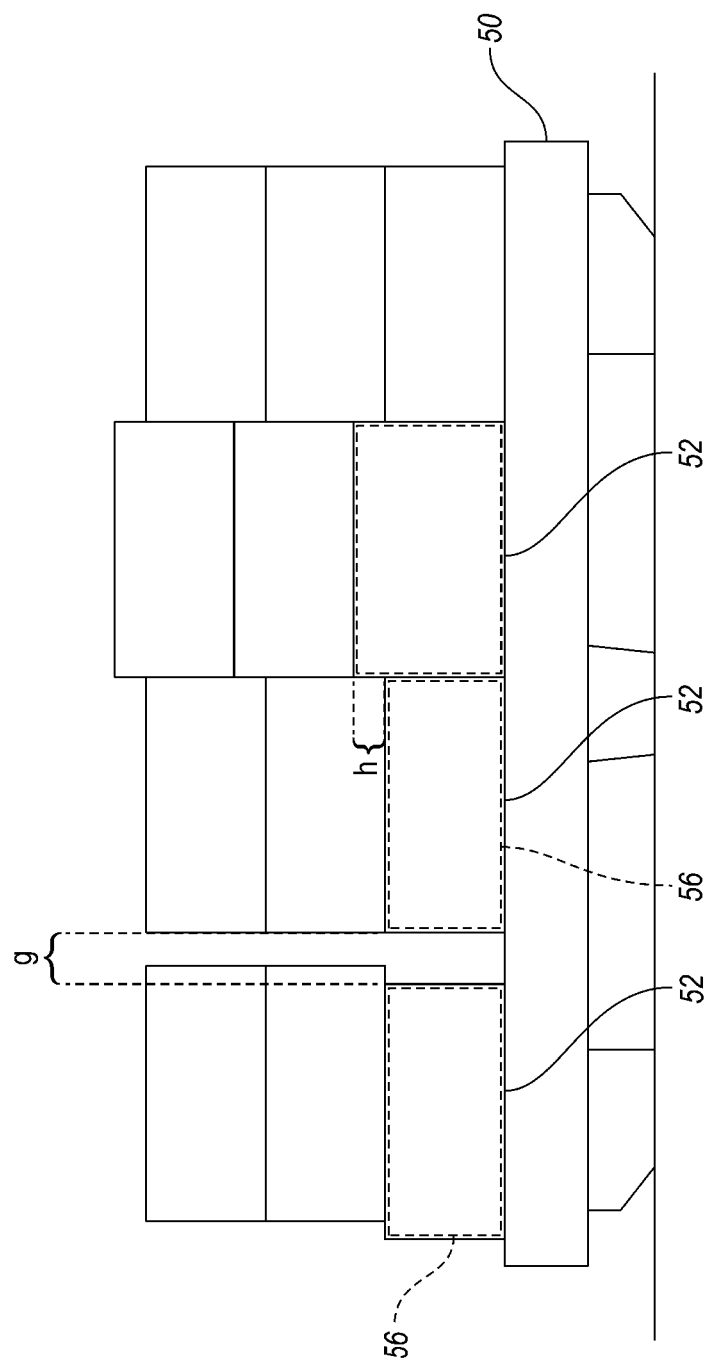
FIG. 6B shows an example loaded pallet with low stability.

FIG. 6B shows an example loaded pallet 50 with low stability. Images of the packages 52 are analyzed and bounding boxes 56 of all the packages 52 are determined (only three shown) in step 112. Package types 114 are inferred in step 114 to be cardboard boxes and the interfaces between these layers is evaluated in step 120, which would be lower stability. Based upon the coordinates of the bounding boxes 56 of the packages 52, the server 30 determines that there are large gaps g between two packages 52 in the bottom layer (step 116). The server 30 also determines that there is a height discrepancy h between two adjacent packages 52 in the bottom layer. Additionally, in step 118, the server 30 determines based upon the coordinates of the bounding boxes that the packages 52 are column-stacked, which is less stable. Therefore, the server 30 determines in step 122 that the loaded pallet 50 has low stability and that the turntable rate 124 should be low and that a large amount of stretch wrap should be used.

Figure 6C:
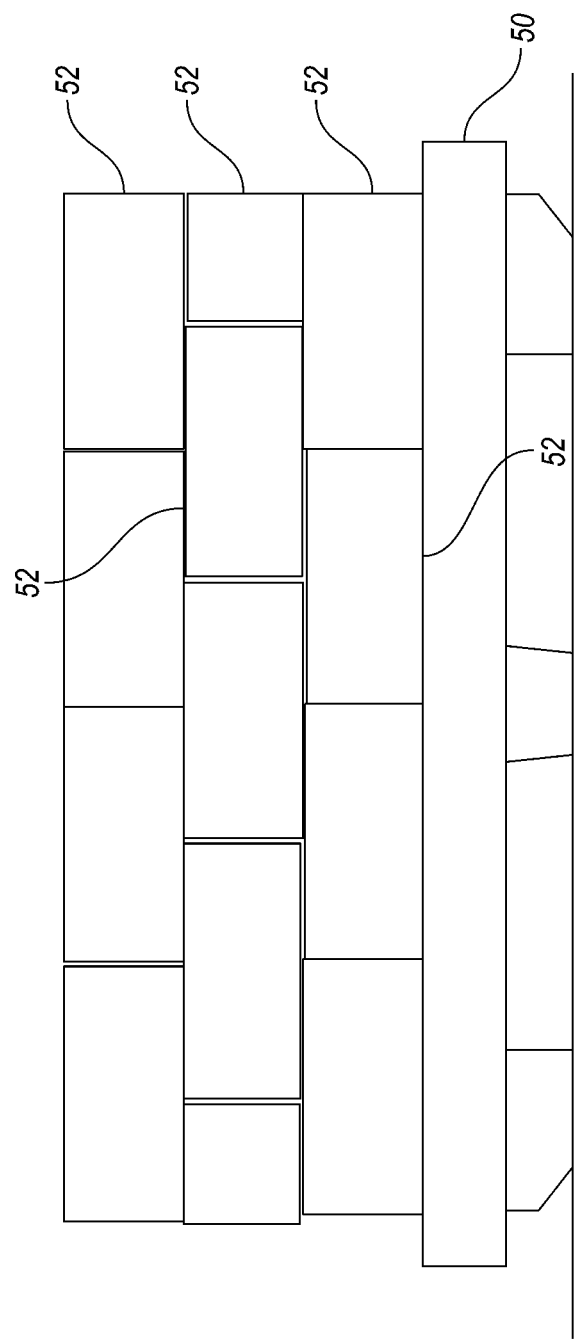
FIG. 6C shows an example loaded pallet with high stability.

In FIG. 6C, an example loaded pallet 50 is shown with high stability. Images of the packages 52 are analyzed and bounding boxes 56 of all the packages 52 are determined (not shown) in step 112. Package types 114 are inferred in step 114 to be cardboard boxes and the interfaces between these layers is evaluated in step 120, which would reduce stability. Based upon the coordinates of the bounding boxes 56 of the packages 52, the server 30 determines that there are no large gaps between packages 52 (step 116). The server 30 also determines that there are no significant height discrepancies between adjacent packages 52. Additionally, in step 118, the server 30 determines based upon the coordinates of the bounding boxes that the packages 52 are brick-stacked and cross-stacked. Therefore, the server 30 determines in step 122 that the loaded pallet 50 has relatively high stability and that the turntable rate 124 should be fairly high and that a low amount of stretch wrap should be used.

Figure 7A:
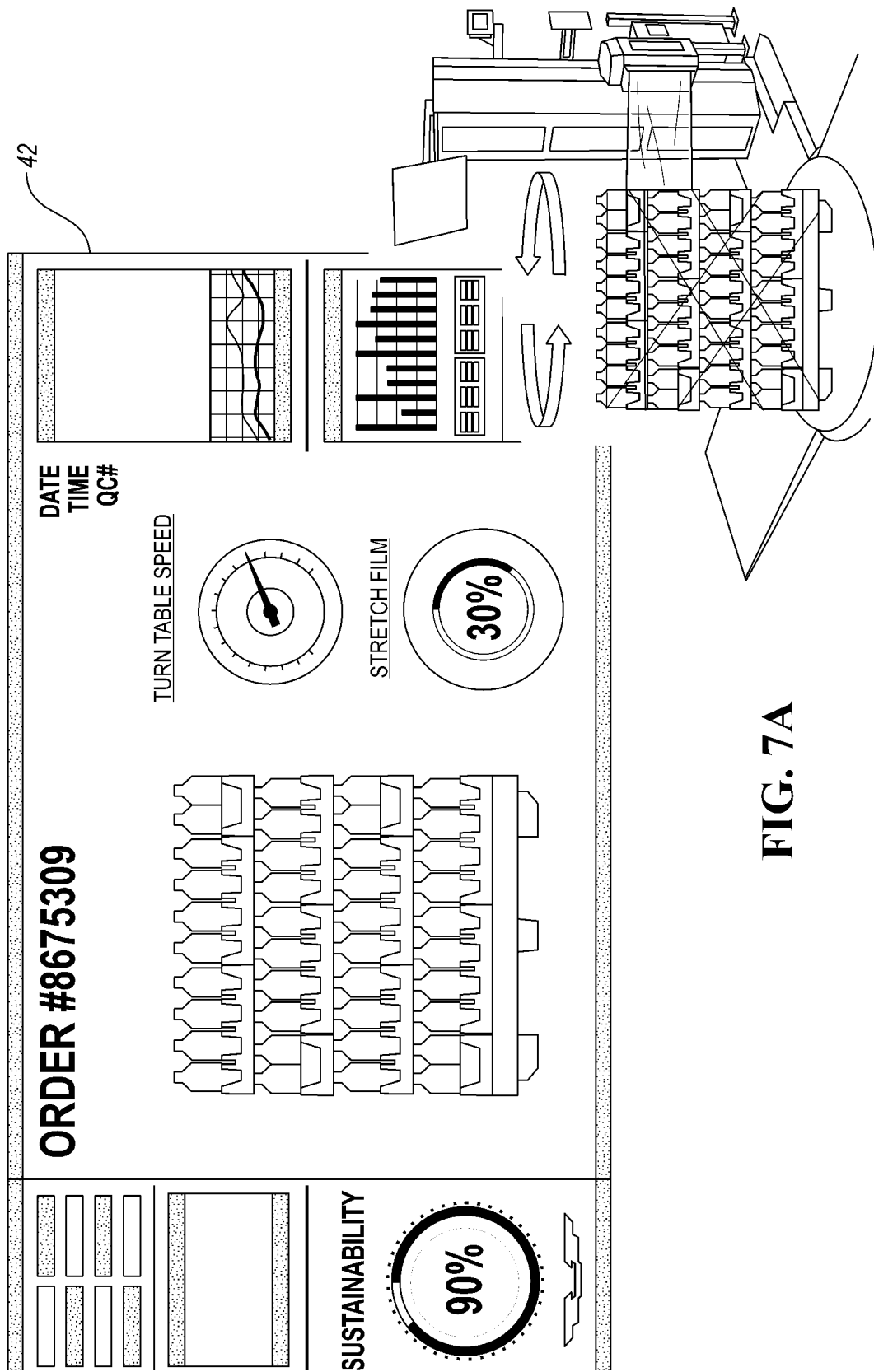
FIG. 7A shows an example user interface screen and a wrapper wrapping a loaded pallet based upon a stability analysis of the loaded pallet.

FIG. 7A shows an example screen 42 that could be displayed on user interface 24. Again the screen 42 shows the sustainability score. The screen 42 also shows a proposed turntable speed and a proposed amount of stretch film to use. Each interface between two layers (and between the bottom layer and the pallet) is evaluated separately. Also, each layer is evaluated itself for gaps and height inconsistencies, which decrease stability. Because the stack of items on the pallet 50 in this example is cross-stacked plastic beverage crates (the bottle caps in one layers are received in recesses in the crates of the layer above), this is a fairly stable stack. Further, the items in each layer are the same height.

Therefore, the computer 26 determines that the turntable speed is relatively high (about 70%) and that only 30% stretch film is required. The computer 26 then controls the turntable 14 to rotate at the selected speed while the stretch film 20 is applied, and the computer 26 controls the vertical position of the roll of stretch film 20 while the turntable 14 rotates. The computer 26 controls the turntable 14 and roll of stretch film 20 to wrap the loaded pallet 50 as shown in FIG. 7A (including an X pattern on the sides), which is considered about a 30% stretch film 20 application.

Figure 7B:
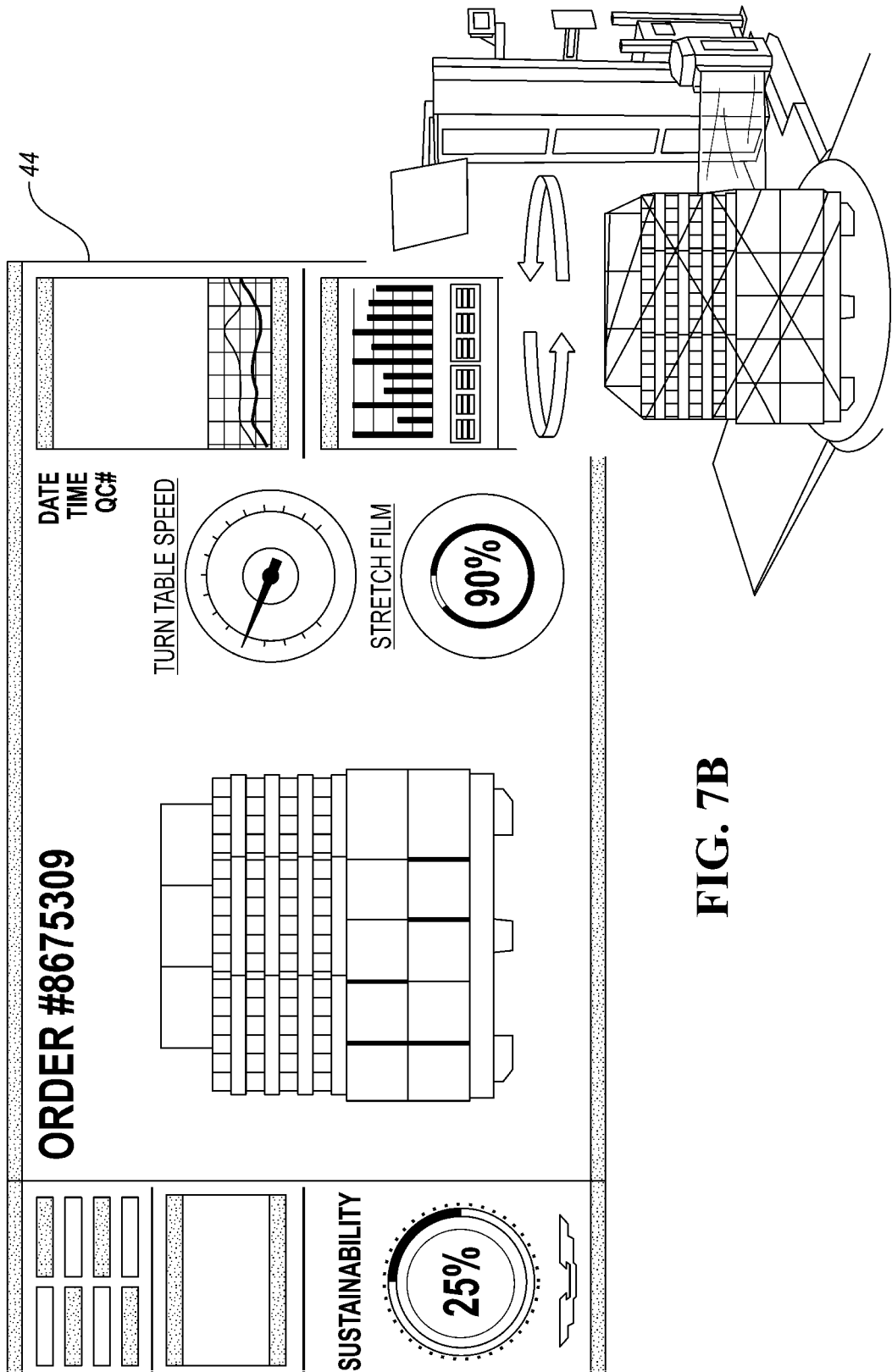
FIG. 7B shows the example interface and wrapper of FIG. 7A wrapping a low stability loaded pallet.

An example with another loaded pallet 50 is shown on the screen 44 of FIG. 7B. In this loaded pallet 50, the corrugated cardboard boxes in the bottom two layers do not interlock at all; nor do the cardboard trays with plastic overwrap (with plastic bottles therein) interlock with one another; nor do the top layer of corrugated cardboard boxes on top of the cardboard trays with plastic overwrap (the top layers is also less stable because it is the top layer). Further, some gaps are identified in the bottom two layers. There are no height discrepancies within any of the layers. The pallet itself is determined to be stable.

Therefore, the computer 26 (or server 30) determines that the turntable speed is relatively slow (about 25%) and that 90% stretch film coverage is required. The computer 26 then controls the turntable 14 to rotate at the selected speed while the stretch film 20 is applied, and the computer 26 controls the vertical position of the roll of stretch film 20 while the turntable 14 rotates. The number of times that the turntable 14 is rotated while the stretch film 20 is applied is also determined by the computer 26 (or server 30) based upon the determined stability, i.e. more turns (more layers of stretch film 20) for a less stable loaded pallet 50. The computer 26 controls the turntable 14 and roll of stretch film 20 to wrap the loaded pallet 50 as shown in FIG. 7B (including an X pattern on the sides with overlapping horizontal layers over it), which is considered about a 90% stretch film 20 application.

QC Bot

Figure 8:
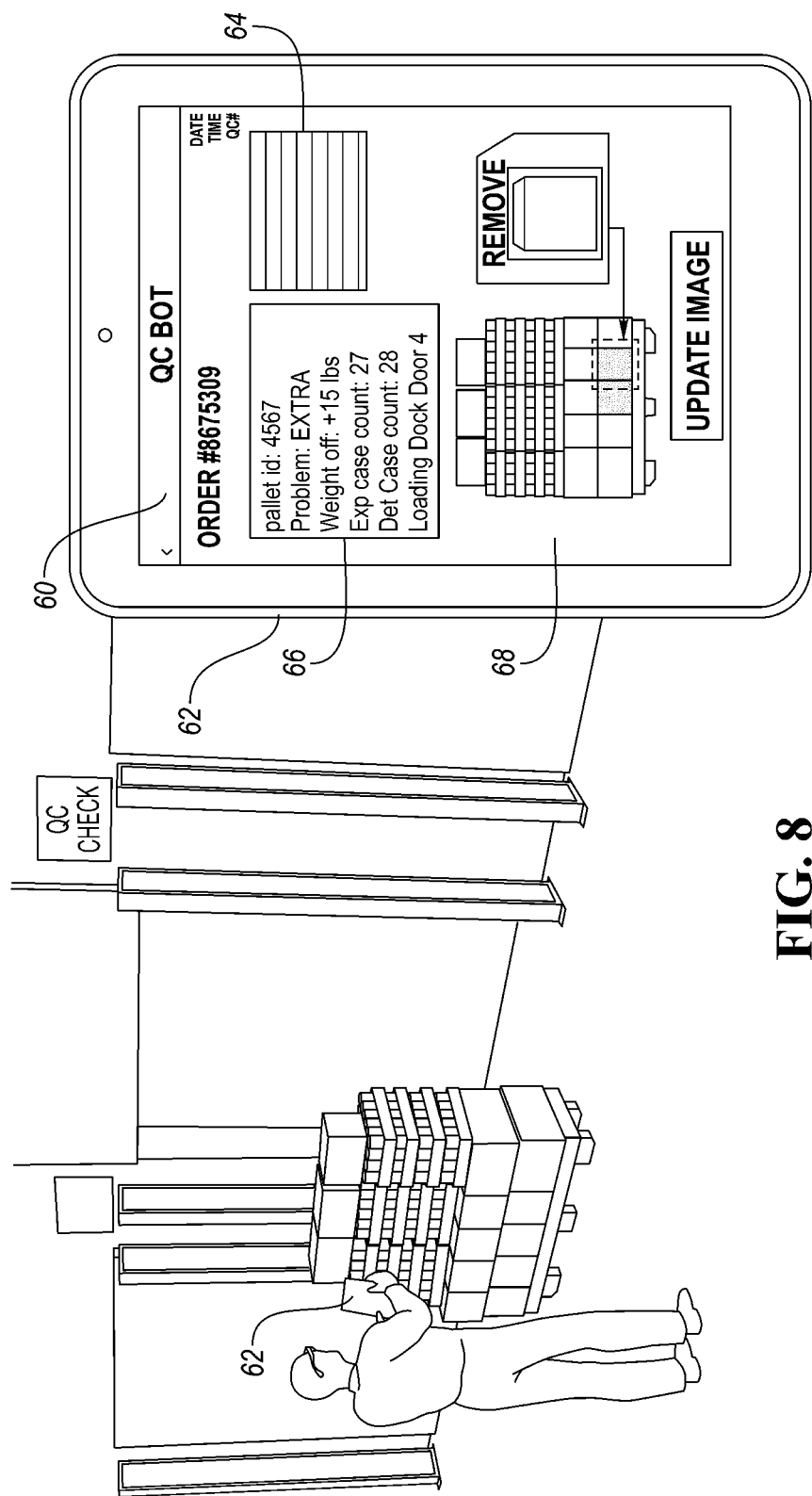
FIG. 8 shows a first phase of a QC bot implemented on a tablet.

FIG. 8 shows a first embodiment of a QC bot having a QC interface 60 implemented on a user interface device 62 such as a tablet having a touchscreen, processor(s), storage, wireless communication (as is well-known—such as an iPad). Instructions in the storage would perform the functions described herein when executed by the processor(s). If the system 10 of FIG. 1 determines an error or potential error, then prior to wrapping, the system 10 directs the user to move the loaded pallet 50 to a QC check area (FIG. 8).

The computer 26 sends the information regarding the error or potential error to the QC bot running on the user interface device 62. The computer 26 also sends one or more of the images of the loaded pallet 50 taken by camera 16 to the QC bot. The QC bot displays information on the QC interface 60 that will be useful to the QC worker.

For example, as shown in FIG. 8, the QC interface 60 shows the QC worker an image 68 of the loaded pallet 50 with the error or potential error highlighted (e.g. by superimposing a box or outline around one or more items). The image 68 may be one of the images taken during validation by camera 14. In the example shown, a single item is identified on the image 68 of the loaded pallet 50 with an instruction to "remove" that item along with a picture 69 of that item to be removed (either from a database of the expected items or a cropped portion of the image 68). Additional remedial steps may be instructed sequentially.

The QC interface 60 also shows some of the information that indicated the error (or potential error) and instructions for how to resolve the error or potential error. The QC interface 60 also shows the QC worker the pallet pick list 64 associated with that pallet 50 (i.e. the complete list of what should be on the pallet 50) and the loading dock door to which the pallet 50 should be taken after being checked/fixed.

In the specific example shown in FIG. 8, the QC bot presents on the interface 60 an information field 66 indicating: pallet id, the type of problem detected (e.g. extra item), the fact that the weight was 15 lbs higher than it should have been, the fact that the case count is one too high, and that the pallet 50 should be loaded at loading dock door 4. The complete pallet pick list 64 is also indicated on the screen.

After the QC worker remedies the problem, the QC worker takes another image of the loaded pallet 50 (e.g. with the user interface device 62) and the QC bot 60 may revalidate the loaded pallet 50 or simply verify that the instructions were followed and/or the case count is now correct. Alternatively, the QC worker may return the loaded pallet 50 to the wrapper of FIG. 1 to be revalidated and wrapped.

Figure 10:
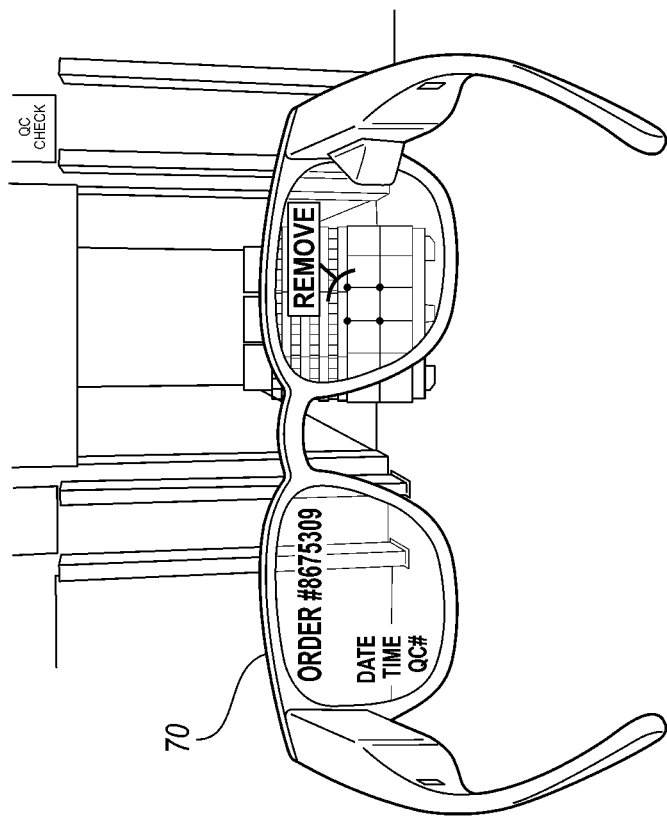
FIG. 10 shows the QC bot implementation of FIG. 9, looking through the smart glasses.
Figure 9:
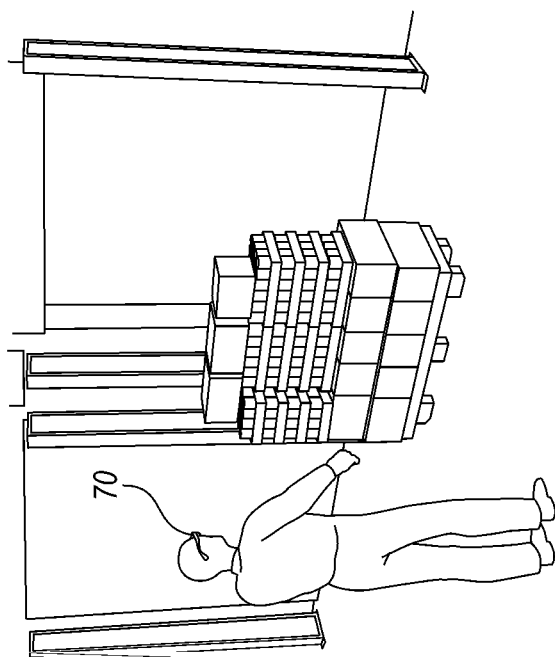
FIG. 9 shows the QC bot implemented with smart glasses.

Referring to FIGS. 9 and 10, the QC interface can also be implemented with smart glasses 70 (such as Google Glass), which can provide the QC worker with the same information as in FIG. 8 but can also directly mark the item on the pallet 50 to be removed, such as via superimposition of lines outlining the item. In this case the QC bot may run on the computer 26 or on the server 30 or a dedicated QC computer communicating wirelessly with the smart glasses 70.

Figure 11:
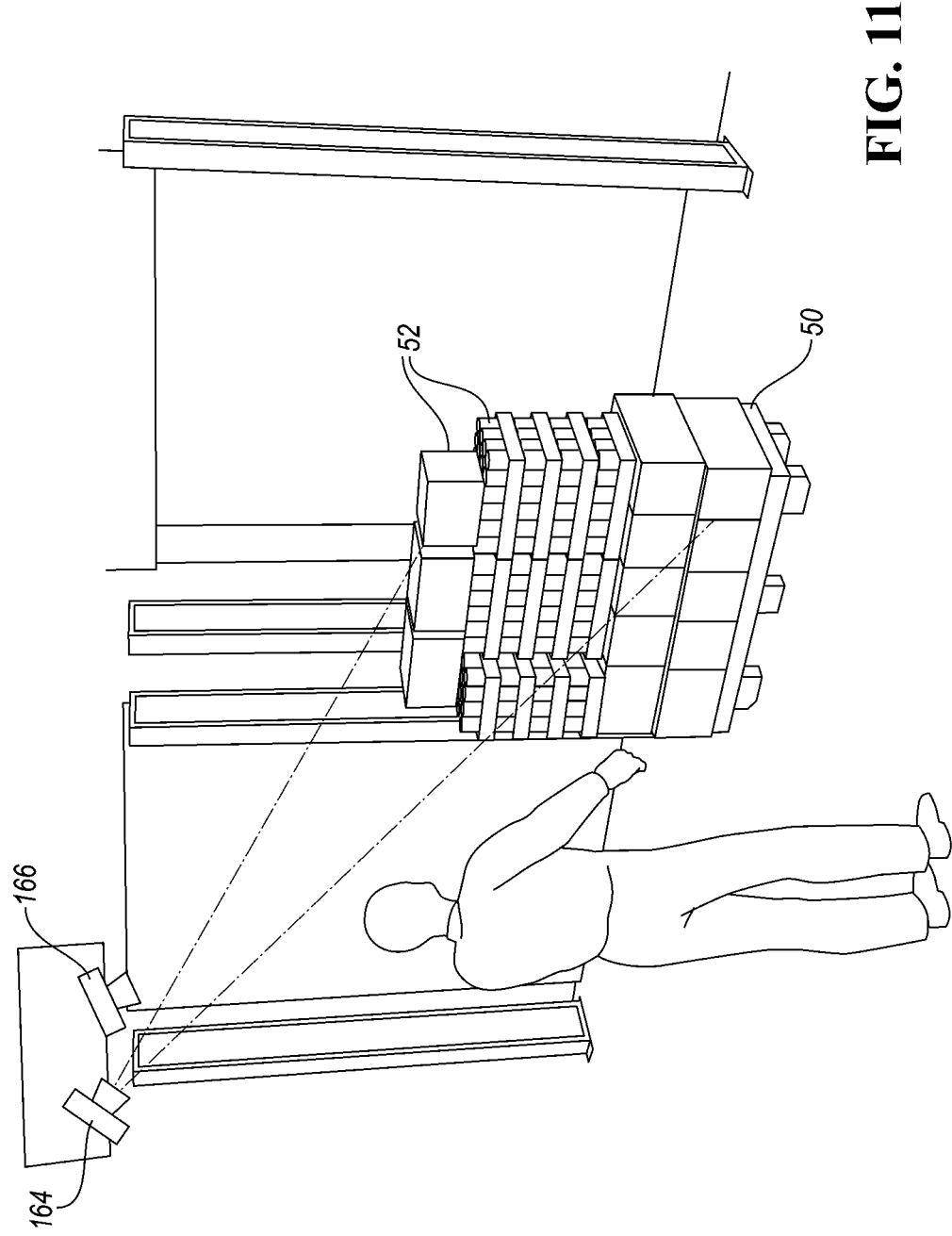
FIG. 11 shows the QC bot implemented with a projector.
Figure 12:
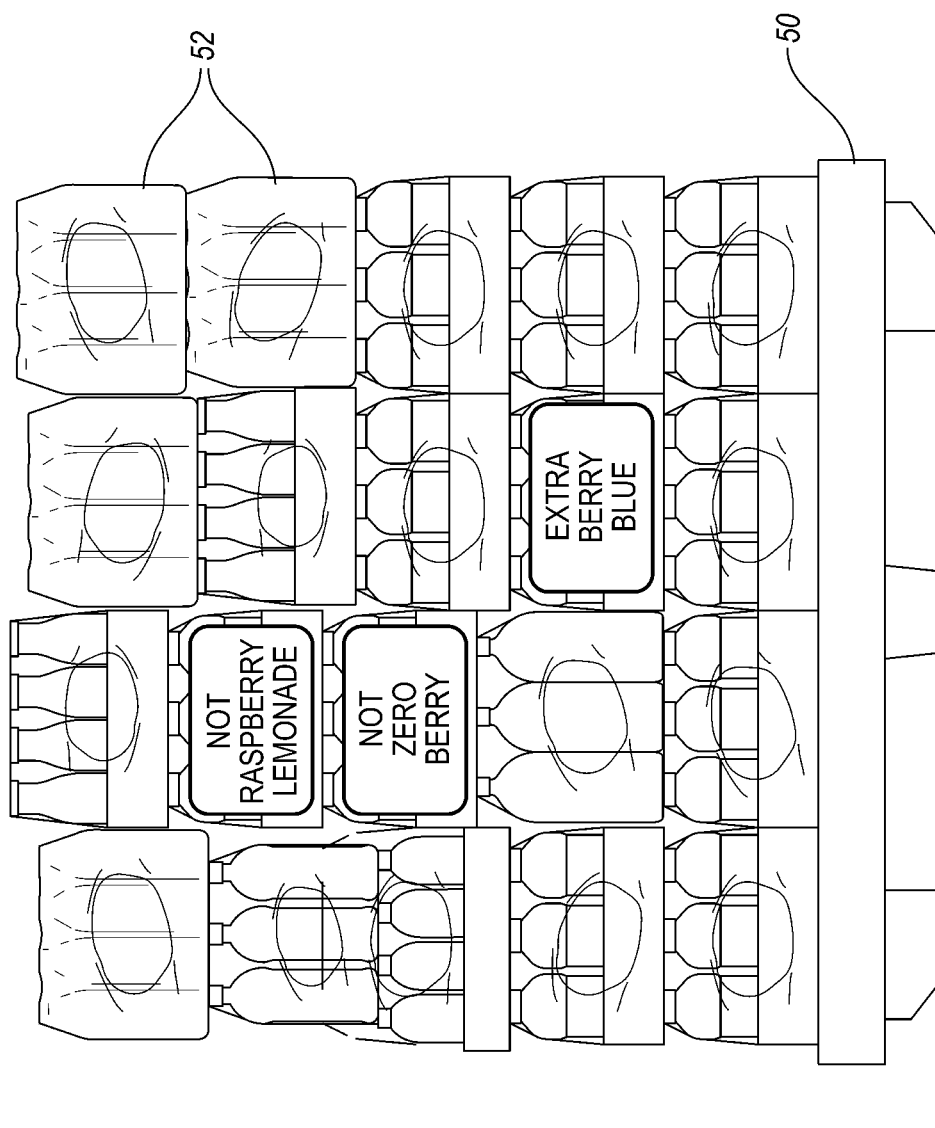
FIG. 12 shows images projected onto a loaded pallet by the projector of FIG. 11.

FIGS. 11 and 12 show an alternate implementation of the QC bot. In this embodiment, referring to FIG. 11, a projector 164 is mounted near the QC station (e.g. overhead). The projector 164 could be an LED projector or laser projector and includes a camera 166 or other device for receiving input from the user.

As shown in FIG. 12, the projector 164 projects the QC interface including the error notifications (or potential errors or unconfirmed SKUs) onto the pallet 50 and products 52 themselves. For example, in FIG. 12, the projector 164 has projected "extra berry blue" directly onto one of the products 52 on the pallet 50 (indicating that this item (a "berry blue") should be removed). The projector 164 has also projected "Not Zero Berry" onto another product 52 and "Not Raspberry Lemonade" onto another (indicating that these items should be removed and replaced with the proper items, "Zero Berry" and "Raspberry Lemonade"). The projected errors enable the user to be able to quickly see what is wrong with the pallet.

Using gestures, such as touching one of the indicated products in combination with some particular gesture, the user can override or clear the error after determining that the correct product is present. Or the user can confirm the error and remove the product or remove and replace the product and then provide a gesture (or other feedback, such as audible) that the error has been corrected.

Any error that is cleared or updated will cause the software to update labels for active learning. For example, in response to the "Not Zero Berry" error notification, the user could indicate (via gestures or verbal instructions over a headset) that the item is in fact "Zero Berry." This may occur if the packaging for Zero Berry has changed, or simply because of an error by the server 30. Either way, the image of that item can then be used to train the machine learning model(s) 31*a-c* in the server 30 so that the machine learning model(s) will recognize that packaging as "Zero Berry" in the future.

Besides removing a product, the QC bot 60 may ask the QC worker to inspect and verify one or more products (if one or more items could not be visually verified with sufficient confidence during validation), substitute one product for another, or add one or more products. The QC worker may provide inputs and feedback to the QC interface via spoken commands over a microphone on the smart glasses or via a headset.

Alternatively, a remote worker can audit a loaded pallet. The remote worker can be presented with the images of the suspect items and can confirm whether the suspect items are correct or incorrect. If the remote worker says that the suspect items are correct, the loaded pallet is verified and no further action need be taken. If the remote worker indicates that the suspect items are a true error by the picker, then a local worker can correct the error, or this information can be passed to the driver for correction as indicated below.

Figure 13:
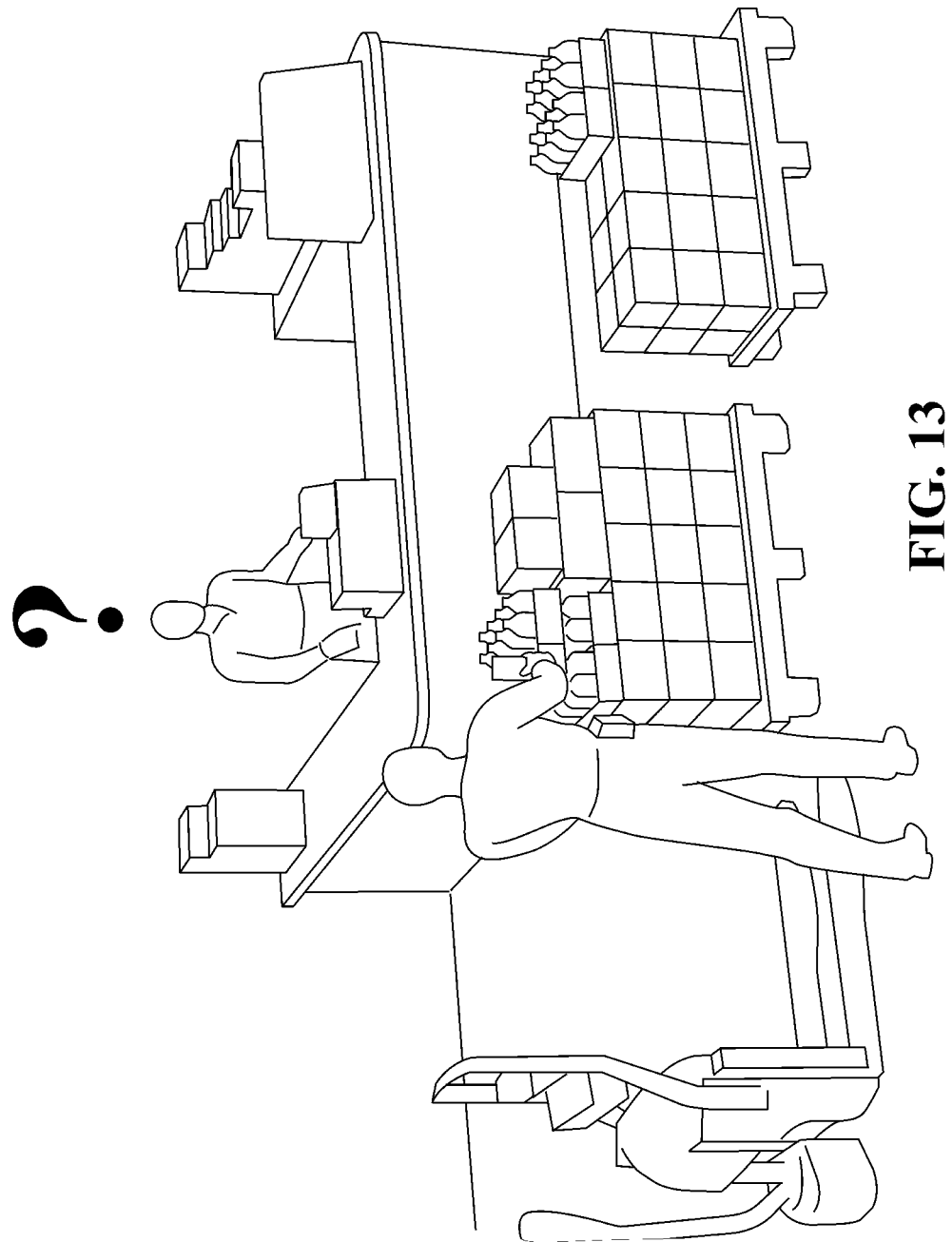
FIG. 13 shows the verified loaded pallets being delivered to a store.
Figure 14:
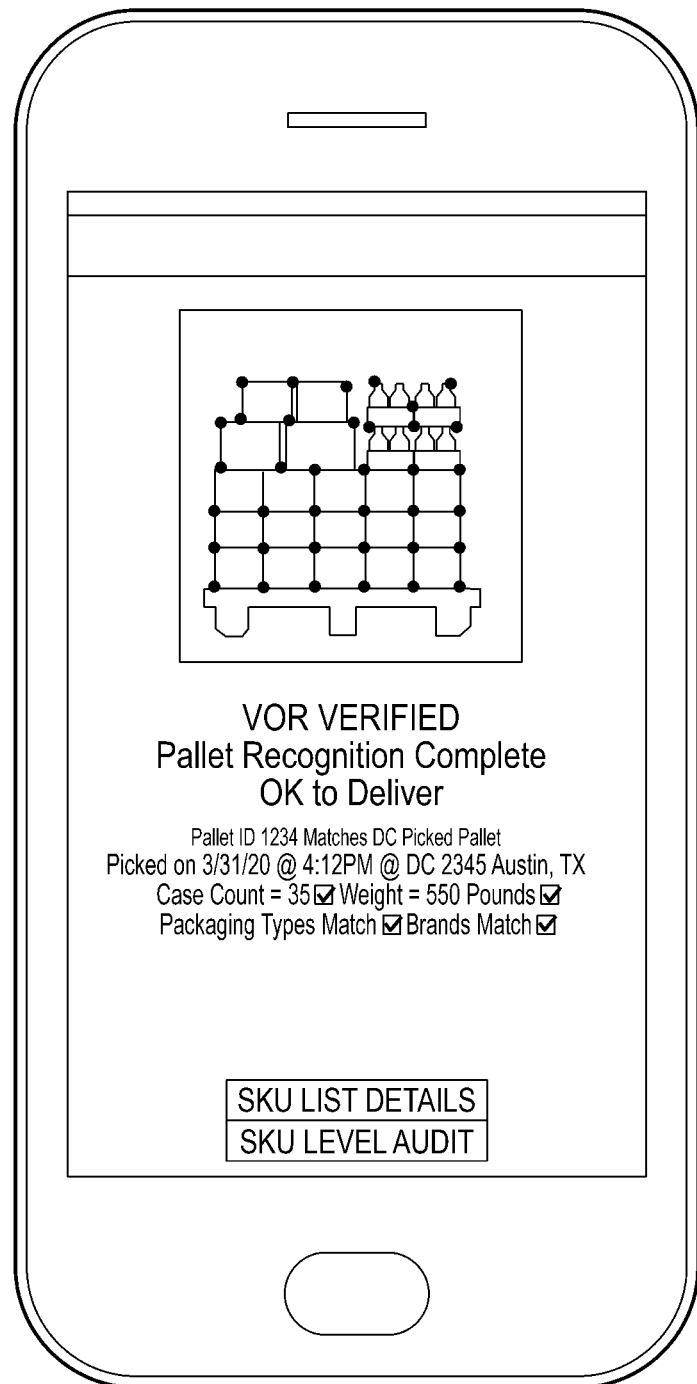
FIG. 14 shows a portion of the audit history on the delivery person's mobile device of FIG. 13.

Referring to FIGS. 13 and 14, the audit history, including the instructions and history of images of the pallet 50 are stored (e.g. in server 30) in the event that there are ever any questions about the loaded pallet 50. In FIGS. 13 and 14, the history is displayed on the delivery person's mobile device, and indicated as "verified," so the delivery person can show this to the worker at the store where the loaded pallet 50 is being delivered. This can avoid the delivery person and the store worker having to verify the items being delivered, which can be time-consuming.

Alternatively, if the corrections are not actually made on the pallet, the data is updated for the driver so that the delivery driver can make the correction at the store. It is easy for the driver to remove an extra item or two from a loaded pallet at the store. The delivery driver could also have some extra stock in the truck to fill in any missing items. Optionally, a pick list can be generated for a separate pallet with all of the items missing from the entire route. That separate pallet can be picked and loaded on that truck just before it leaves the loading dock.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wrapping system comprising:
   a turntable for supporting a stack of a plurality of packages;
   a camera configured to take a plurality of images of the stack of the plurality of packages while supported on the turntable;
   a supply of wrap adjacent the turntable;
   at least one processor; and
   at least one non-transitory computer-readable medium storing:
      at least one machine learning model that has been trained with a plurality of images of packages of beverage containers; and
      instructions that, when executed by the at least one processor, cause the at least one processor to perform operations comprising:
      a) receiving a plurality of images of a stack of a plurality of packages of beverage containers on a pallet;
      b) inferring a package type of each the plurality of packages of beverage containers based upon the plurality of images of the stack using the at least one machine learning model;
      c) based upon inferred package types, determining a stability of the stack;
      d) based upon the stability of the stack from operation c), determining how to wrap the stack of the plurality of packages of beverage containers; and
      e) controlling the turntable to wrap the stack of the plurality of packages based upon operation d).

2. The wrapping system of claim 1 wherein the operation of controlling the turntable includes establishing a speed of rotation of the turntable based upon the stability of the stack from operation c).

3. The wrapping system of claim 1 wherein the operation of controlling the turntable includes determining an amount of wrap to place around the stack of the plurality of packages based upon the stability of the stack from operation c).

4. The wrapping system of claim 1 wherein the determination in operation d) includes determining an amount of wrap to place around the stack of the plurality of packages.

5. The wrapping system of claim 1 wherein the determination in operation d) includes determining a speed to wrap the stack of the plurality of packages.

6. The wrapping system of claim 1 wherein the operations further include measuring gaps between adjacent ones of the plurality of packages, and wherein operation c) is also performed based upon the measured gaps.

7. The wrapping system of claim 1 wherein operation c) further includes evaluating the package types of adjacent layers to evaluate an interface between the adjacent layers and wherein determining a stability of the stack is based upon the interface.

8. The wrapping system of claim 1 wherein the operations further include evaluating alignment of packages in adjacent layers including whether the packages in adjacent layers are column-stacked, and wherein operation c) is performed based upon the alignment of packages in adjacent layers.

9. A computing system for validating a stack of a plurality of packages comprising:
   at least one processor; and
   at least one non-transitory computer-readable medium storing:
      at least one machine learning model that has been trained with a plurality of images of packages of beverage containers; and
      instructions that, when executed by the at least one processor, cause the computing system to perform operations comprising:
      a) receiving at least one image of the stack of the plurality of packages of beverage containers;
      b) inferring a SKU associated with each of the plurality of packages of beverage containers based upon the at least one image using the at least one machine learning model;
      c) comparing the inferred SKUs to an expected list of SKUs in an order;
      d) determining an error based upon step c); and
      e) generating a display in which the error is indicated on one of the plurality of packages.

10. The computing system of claim 9 wherein operation e) further includes superimposing an indicator on one of the at least one image of the stack to indicate the error.

11. The computing system of claim 9 further including a translucent display, wherein operation e) further includes superimposing an indicator on the translucent display in a position corresponding to the one of the plurality of packages.

12. The computing system of claim 9 further including a projector, wherein operation e) further includes projecting an indicator with the projector onto the one of the plurality of packages.

13. A computing system for imaging and evaluating a stack of a plurality of packages of beverage containers comprising:

at least one processor; and at least one non-transitory computer-readable medium storing:

at least one machine learning model that has been trained with a plurality of images of packages of beverage containers; and instructions that, when executed by the at least one processor, cause the computing system to perform operations comprising:

a) receiving at least one image of the stack of the plurality of packages of beverage containers;

b) inferring a package type of each of the plurality of packages of beverage containers based upon the at least one image using the at least one machine learning model; and c) based upon the package type inferred for each of the plurality of packages of beverage containers, determining a sustainability rating.

14. The computing system of claim 13 wherein the operations further include:

d) displaying an image of the stack of the plurality of packages of beverage containers indicating the package types of the plurality of packages and relative sustainability of the plurality of packages.

15. The computing system of claim 13 wherein the operations further include:

inferring a pallet type of a pallet on which the stack of the plurality of images are supported based upon the at least one image using the at least one machine learning model, wherein the sustainability rating is further based upon the inferred pallet type.

16. The computing system of claim 13 wherein the operations further include:

inferring a SKU of each of the plurality of packages based upon the at least one machine learning model and based upon the at least one image; and comparing the inferred SKUs for each of the plurality of packages with a plurality of expected SKUs in an order.

17. The computing system of claim 13 wherein the operations further include:

providing a user interface enabling a user to propose a change to the package types of at least one of the plurality of packages; and based upon the proposed change, indicating in the user interface how the proposed change would change a relative sustainability of the plurality of packages.

18. The computing system of claim 13 wherein the sustainability rating is based upon whether the packages are reusable.

19. A wrapping system comprising:

a turntable for supporting a stack of a plurality of packages;

a camera configured to take a plurality of images of the stack of the plurality of packages while supported on the turntable;

a supply of wrap adjacent the turntable;

at least one processor; and at least one non-transitory computer-readable medium storing:

at least one machine learning model that has been trained with a plurality of images of packages of beverage containers; and instructions that, when executed by the at least one processor, cause the wrapping system to perform operations comprising:

a) receiving a plurality of images of a stack of a plurality of packages of beverage containers on a pallet;

b) inferring a package type of each the plurality of packages of beverage containers based upon the plurality of images of the stack using the at least one machine learning model;

c) evaluating alignment of packages in adjacent layers including whether the packages in adjacent layers are column-stacked;

d) determining gaps between adjacent ones of the plurality of packages;

e) based upon inferred package types, the gaps and the alignment, determining a stability of the stack;

f) based upon the stability of the stack from operation e), determining how to wrap the stack of the plurality of packages of beverage containers; and g) controlling the turntable to wrap the stack of the plurality of packages based upon operation e), including establishing a speed of rotation of the turntable based upon the stability of the stack from operation e) and determining an amount of wrap to place around the stack of the plurality of packages based upon the stability of the stack from operation e).

20. The wrapping system of claim 19 wherein the operations further include:

based upon the package type inferred for each of the plurality of packages of beverage containers, determining a sustainability rating; and displaying an image of the stack of the plurality of packages of beverage containers indicating the package types of the plurality of packages and relative sustainability of the plurality of packages.

* * * * *